Figure 1:
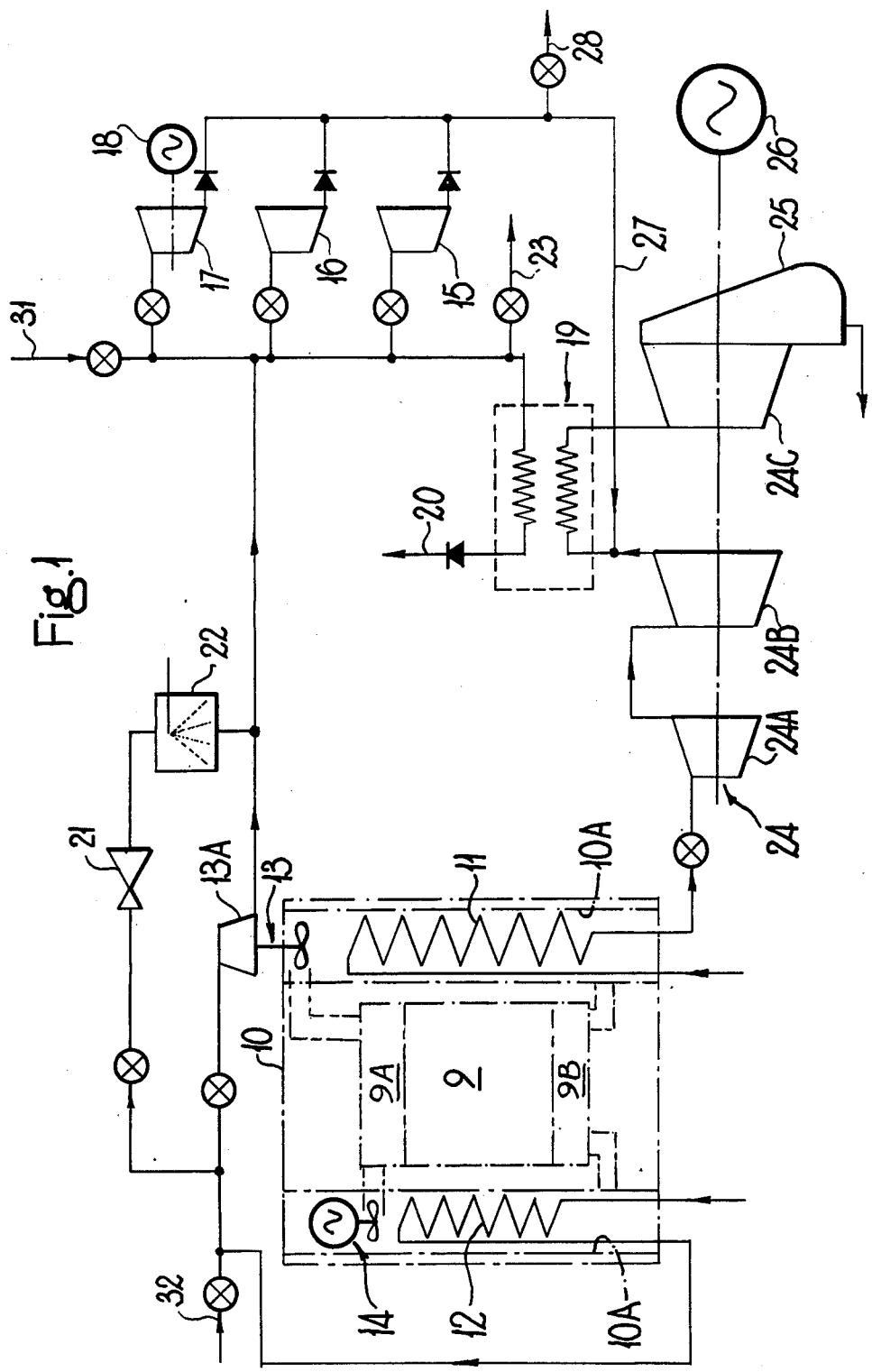

United States Patent [19]

George et al.

[11] 4,048,012
[45] Sept. 13, 1977

[54] NUCLEAR POWER INSTALLATIONS

[75] Inventors: Brian Victor George, Willoughby Waterleys; Colin James Drayrer, Oxon Way, both of England

[73] Assignee: Nuclear Power Company (Whetstone Limited), England

[21] Appl. No.: 643,676

[22] Filed: Dec. 23, 1975

Related U.S. Application Data

[63] Continuation of Ser. No. 390,006, Aug. 20, 1973, abandoned.

[30] Foreign Application Priority Data

Aug. 24, 1972  United Kingdom .............. 39409/72

[51] Int. Cl.² ............................................. G21C 15/00
[52] U.S. Cl. ........................................ 176/60; 176/65; 60/676; 60/679; 60/644
[58] Field of Search ...................... 176/37, 38, 58–60, 176/61, 87, 65; 60/676, 679, 644

[56] References Cited

U.S. PATENT DOCUMENTS

| | | | |
|---|---|---|---|
| 2,968,156 | 1/1961 | Pacault et al. ................... | 60/DIG. 4 |
| 3,170,846 | 2/1965 | Blumberg, Jr. .................... | 176/60 X |
| 3,175,953 | 3/1965 | Nettel et al. ........................ | 176/60 |
| 3,180,798 | 4/1965 | Brunner ............................... | 176/60 |
| 3,247,072 | 4/1966 | Edlund et al. ...................... | 176/60 X |
| 3,379,616 | 4/1968 | Vitry ..................................... | 176/65 X |
| 3,666,628 | 5/1972 | Harand et al. ....................... | 176/60 |
| 3,748,229 | 7/1973 | Schill ................................... | 176/65 |

FOREIGN PATENT DOCUMENTS 1,437,467  3/1966  France .................................. 176/65

*Primary Examiner*—Samuel W. Engle
*Assistant Examiner*—S. A. Cangialosi
*Attorney, Agent, or Firm*—Kirschstein, Kirschstein, Ottinger & Frank

[57] ABSTRACT

In a nuclear-reactor power-generating installation having a main and an auxiliary steam-generating boiler, both arranged to receive heat from the reactor core (for example by circulation of reactor coolant gas), and having a turbogenerator which includes a multistage steam turbine through whose stages the steam from the main boiler passes in sequence, there being a steam reheater unit connected between two of the stages to provide reheating of the steam from the main boiler, the invention provides that the auxiliary boiler is connected to supply to the reheater unit steam which reheats the said steam from the main boiler.

5 Claims, 2 Drawing Figures

NUCLEAR POWER INSTALLATIONS

This is a continuation of application Ser. No. 390,006, filed Aug. 20, 1973, now abandoned.

This invention relates to nuclear-reactor power installations and more particularly to such installations of the kind having associated with a nuclear reactor core not only one or more main steam-generating boilers but also one or more auxiliary steam-generating boilers, both the main and the auxiliary boilers receiving heat from the nuclear core.

In such nuclear-reactor power installations, as disclosed and claimed in co-pending application Ser. No. 178,525 filed on 30th Aug. 1971 by Reginald Kenneth Cook and Brian Victor George for "Boiler Systems", now abandoned there are good reasons for providing that the auxiliary boiler or boilers shall be able to absorb about 20 percent of the designed maximum thermal output of the reactor core; and the steam thus generated may be utilised partly to provide reactor services and partly to drive auxiliary turbogenerators to augment the electrical output from main turbogenerators driven by steam from the main boilers.

However, as the size of such a nuclear power installation is increased, the size and or number of such auxiliary turbogenerators, if they are to be capable of absorbing the energy available as steam from the auxiliary boilers, requires to be increased to such a point that the advantages originally envisaged from providing both main and auxiliary boiler-and-turbogenerator systems are no longer obtained in full measure.

This tendency may be alleviated, up to certain point, by utilizing a substantial part of the energy of the steam from the auxiliary boilers to drive main coolant circulators for circulating the coolant gas which extracts heat from the reactor core and delivers it to the main boilers; and such an arrangement is described and claimed in co-pending application Ser. No. 350,629 filed on 12th Apr. 1973 by Brian Victor George for "Nuclear Power Installations", now U.S. Pat. No. 3,937,652.

Particularly with reactor installations with a really large power output, however, there is likely to be substantial excess of energy in the steam which it is desirable to arrange for the auxiliary boilers to generate, compared with the total energy that can be absorbed by the main coolant circulators and by the provision of other reactor services, and this excess is likely to be too great to be utilised in auxiliary turbogenerators unless these are undesirably large or undesirably numerous.

It is an object of the present invention to provide an advantageous utilisation of the stem produced by the auxiliary boilers of such installations; and this object is achieved, according to the invention, by arranging that at least part of the steam from the auxiliary boilers is utilised to provide steam-to-steam reheat in the steam circuit with which the main boilers of the installation are associated.

According to the invention, therefore there is provided a nuclear-reactor power-generating installation having a nuclear core, a main steam-generating boiler and an auxiliary steam-generating boiler both arranged to receive heat generated in the core, a main turbogenerator which includes a steam turbine having a plurality of turbine stages through which steam from the main boiler passes in sequence, and a steam reheater unit connected between two of the stages to reheat the said steam from the main boiler, wherein the auxiliary boiler is connected to supply to the reheater unit steam which reheats the said steam from the main boiler.

It is, of course, known to provide steam-to-steam reheat in the main boiler-turbogenerator circuit of a nuclear-reactor installation by bleeding steam from a point between high-pressure and intermediate-pressure stages of the turbogenerator and feeding the bled steam to a steam reheater unit between the intermediate-pressure stage and a low-pressure stage; but the high-pressure stage must then be designed to accommodate, and the boiler supplying the high-pressure stage must be designed to generate, the extra steam which is to be bled off. Accordingly, when the steam to be used for the steam reheat is derived, in accordance with the present invention, from the auxiliary boilers and does not pass through the high-pressure stage of the main turbogenerator, this main turbogenerator can have greater output for a given size of its high-pressure stage and of the main boiler which supplies it with steam.

Figure 2:
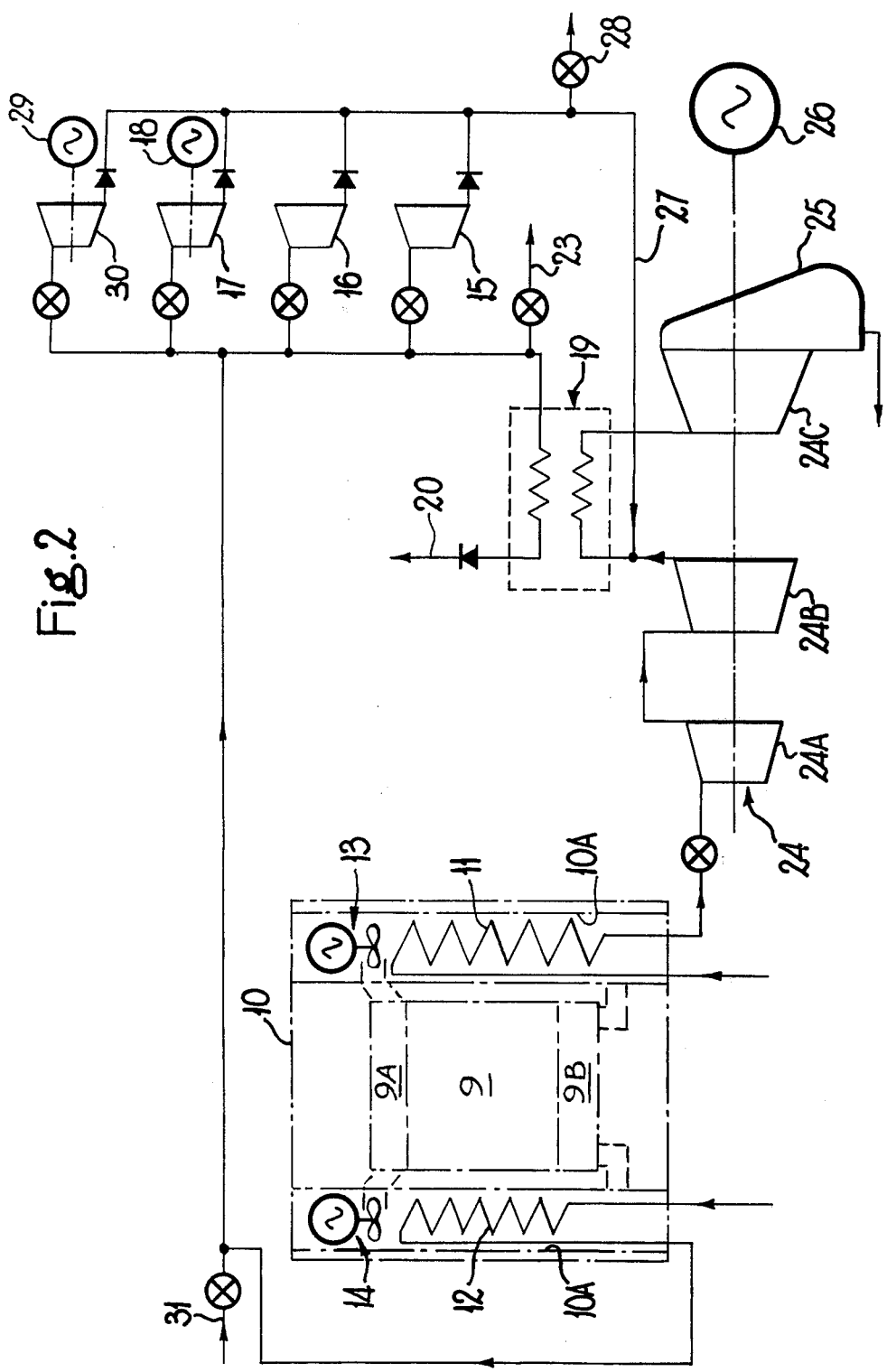

The relevant aspects of the two embodiments of a nuclear-reactor power-generating installation according to the invention are described below, by way of illustration of the invention, with reference to the accompanying drawings in which:

FIG. 1 is a diagrammatic representation of the main and auxiliary steam circuits associated with a nuclear-reactor in which coolant gas is circulated by circulators of which some are driven by steam turbines; and FIG. 2 is a similar representation of main and auxiliary steam circuits in a modified arrangement in which only electrically driven circulators circulate the coolant gas.

Referring now to FIG. 1, a nuclear reactor, which may be halium-cooled high-temperature gas-cooled reactor, comprises a reactor core 9 contained in a pressure vessel 10 which also defines a core-coolant inlet plenum space 9A and a core-coolant outlet plenum space 9B for coolant gas which is circulated through the core and thence to main high-pressure boilers and auxiliary low-pressure boilers which, preferably, are housed within the thickness of the wall of the pressure vessel in cavities 10A communicating through suitable ducts with the plenum chambers 9A and 9B. The arrangement may, for example, be as shown in detail in the earlier of the co-pending Applications referred to above. One of the main boilers is represented in FIG. 1, indicated by reference 11, and similarly one of the auxiliary boilers is represented and indicated by reference 12. Coolant gas which has passed through the main boiler 11 is returned to the inlet plenum space 9A by a gas circulator 13, and coolant gas which has passed through the auxiliary boiler 12 is similarly returned to the inlet plenum space 9A by a circulator 14, which is electrically driven. The coolant flow induced by the circulators 13 and 14 proceeds from the inlet plenum space 9A through the core 9 to the outlet plenum space 9B, whence the heated coolant flows again to the main and auxiliary boilers 11 and 12 at rates which, as will be understood, are determined by the working rates of the circulators 13 and 14 respectively.

The circulator 13 is driven by a steam trubine 13A for which the steam is supplied by the auxiliary boiler 12; and a part of this steam, after leaving the turbine 13A, is employed to drive further low-pressure steam turbines 15, 16 and 17 (respectively driving feedwater pumps to the main and auxiliary boilers and a "house load" generator 18 which provides essential electrical power to the reactor installation). A further (and, usually, major) part of the steam from the turbine 13A is fed to a steam-to-steam reheater unit 19 (which is referred to again below) before being passed through a steam line 20 to heaters and de-aerators (not shown) provided for the feedwater supplied to the main and auxiliary boilers 11 and 12. Any remaining excess of steam from the auxiliary boiler 12 (some of which may bypass the turbine 13A through a pressure-reducing by-pass valve 21 and attemperator 22, is dumped via a dump line 23.

The high-pressure steam generated in the main boiler 11 is fed in turn to high-pressure, intermediate-pressure and low-pressure stage 24A, 24B and 24C of a steam turbine 24 which exhausts into a condenser 25 and which drives a main electrical generator 26. The steam from the intermediate-pressure stage 24B, before entering the low-pressure stage 24C, is reheated by being passed through the reheater 19 where it absorbs heat from that portion of the steam from the auxiliary boiler 12 which is fed to the reheater 19. The steam from the turbines 15, 16 and 17 may also be fed to the reheater 19 via a line 27, to augment the reheated steam fed to the low-pressure stage 24C of the turbine 24, or may be dumped via a dump line 28. Alternatively, the steam line 27 might be connected at the downstream end of the reheater 19, i.e. direct to the input to the low-pressure stage 24C.

The system shown in FIG. 2 is similar, apart from the modifications mentioned below, to that shown in FIG. 1, and corresponding parts are similarly referenced in the two Figures. In the FIG. 2 arrangement, however, the coolant gas circulators 13 associated with the main boilers 11 are electrically driven and the steam from the auxiliary boilers 12, generated at correspondingly lower pressure, is fed direct to the turbines 15, 16 and 17 and to the steam-to-steam reheater 19. As also shown, there is additionally provided a variable-frequency turbogenerator comprising a generator 29 driven at variable speed by a turbine 30 which is driven by a part of the steam from the auxilia;ry boiler 12. The electrical power from this variable-frequency turbogenerator may be used to drive the main and auxiliary coolant-gas circulators 13 and 14.

As already explained, the provision of steam reheat, in the main circuit comprising main boilers 11 and main turbines 24, by means of steam from the auxiliary boilers 12, enables a greater electrical output to be derived from this main circuit for a given size of main boiler 11 and high-pressure stage 24A of the turbine 24. Also as already intimated, the transfer, in the reheater 19, of energy from the auxiliary boiler 12 to the main steam circuit means that the auxiliary boilers may be designed to absorb about 20 percent of the maximum heat generated by the nuclear reactor, as is desirable for safety reasons, without the turbogenerator sets 17, 18 being required to be correspondingly large.

The use of steam from the auxiliary boilers 12 to power the main and auxiliary feedwater pumps and also the main and auxiliary coolant gas circulators (whether directly by means of steam turbines 13A as in FIG. 1, or indirectly by means of turbogenerator sets 29, 30 as in FIG. 2) not only assists in reducing the required size of the auxiliary turbogenerator sets 17, 18 but also provides an advantage in terms of safety and reliability in that there is a high degree of assurance that continuous operation of these accessory functions, and of the nuclear reactor can be maintained under emergency conditions.

If an alternative or standby source of steam is available, such as a station-services fossil fuel boiler, then it may be connected by a steam line 31 which includes a normally-closed valve, as shown (and also, in the arrangement shown in FIG. 1, at correspondingly high pressure via a further line 32 which similarly includes a normally closed valve), so as to be capable of replacing the steam normally provided by the auxiliary boiler 12. It may then prove unnecessary to provide standby diesel-driven or gas-turbine driven generators such as are normally essential to maintain electrical power supplies for the installation in circumstances where it is disconnected from the electrical grid system.

The arrangements illustrated in FIGS. 1 and 2 permit a rapid start-up of the station without requiring substantial import of electrical power from the grid. At start-up, the coolant gas main circulators 13 would be kept inoperative (in the FIG. 1 arrangement this would be effected by by-passing the steam-turbines 13A) until the auxiliary boilers 12 were supplying adequate steam to drive the steam turbines 15, 16 and 17. In general, the advantages (as disclosed in the earlier of the above-mentioned co-pending Applications) accruing from the provision of both main and auxiliary boilers driving main and auxiliary turbogenerators are preserved in the arrangements according to the present invention. Thus, for example, following a reactor trip the auxiliary boilers would continue to function and the steam produced would continue to drive the auxiliary boiler feed pumps and the auxiliary turbogenerators, but would bypass the main coolant-gas circulator drive turbines (in the FIG. 1 arrangement) with suitable pressure reduction and attemperation in order to avoid undesired transients, and any excess steam would be passed via the dump line 23 to a suitable dump condenser or flash tank.

In the installations illustrated in FIGS. 1 and 2, the auxiliary boilers 12 are shown as being of the once-through type. This type of boiler has the advantage of minimising the number of penetrations required in the wall of the pressure vessel 10 of the reactor.

We claim:
1. A gas-cooled nuclear-reactor power-generating installation having
   A. a nuclear reactor core,
   B. a main stream-generating boiler,
   C. an auxiliary steam-generating boiler, independent of said main boiler and distinct therefrom,
   D. a main coolant-gas circulator arranged to circulate coolant gas through the core and through the main boiler, independently of the auxiliary boiler, whereby to generate steam in the main boiler,
   E. an auxiliary coolant-gas circulator arranged to circulate coolant gas through the core and through the auxiliary boiler, independently of the main boiler, whereby to generate steam in the auxiliary boiler,
   F. a main turbogenerator which includes a steam turbine having a plurality of turbine stages through which steam from the main boiler passes in sequence, and
   G. a steam reheater unit connected between two of the turbine stages to reheat the said steam from the main boiler,
   H. the auxiliary boiler being connected to supply to the reheater unit steam which reheats the said steam from the main boiler.

2. An installation as claimed in claim 1, wherein the auxiliary boiler is a once-through boiler.

3. An installation as claimed in claim 1, wherein the main coolant-gas circulator comprises a steam turbine which is connected to be driven by at least a part of the steam supplied by the auxiliary boiler and to exhaust such steam to the reheater unit.

4. An installation as claimed in claim 1 and comprising at least one further steam turbine connected to receive a minor part of the steam supplied by the auxiliary boiler (the reheater unit receiving a major part of such steam), the said further steam turbine being arranged to drive one of the group of installation accessories which comprises an auxiliary electrical generator and feed water pumps for the main boiler and for the auxiliary boiler.

5. An installation as claimed in claim 4, wherein the steam exhausted from the said further steam turbine is mixed with the steam from the main boiler at one of the two points along the path of the steam from the main boiler which points are constituted respectively by an inlet and an outlet of the reheater unit.

* * * * *